B. H. COOK.
PERCOLATOR.
APPLICATION FILED DEC. 2, 1914.

1,190,381.

Patented July 11, 1916.

Witnesses:
René Muine
C. L. Russell

Inventor:
Burton H. Cook,
per Alvey Attens
Attorney.

UNITED STATES PATENT OFFICE.

BURTON H. COOK, OF BROOKLYN, NEW YORK.

PERCOLATOR.

1,190,381.  Specification of Letters Patent.  Patented July 11, 1916.

Application filed December 2, 1914. Serial No. 875,057.

*To all whom it may concern:*

Be it known that I, BURTON H. COOK, a citizen of the United States, and resident of Brooklyn, in the county of Kings and State of New York, have invented certain new and useful Improvements in Percolators, of which the following is a specification.

My invention relates to percolators.

It relates particularly to a new and improved percolator, in which, among other novel and useful features, I employ a water-jacket inclosing the percolated liquid, and I make the percolating operation automatic.

The object of my invention is to provide a simple, cheaply constructed automatically operating and easily demounted percolator for family and public uses.

To carry out my invention, I construct the outer receptacle containing the percolating liquid as a water-jacket for the percolated liquid, and I provide means for automatically delivering the percolating liquid to the material that is under treatment.

Figure 1:
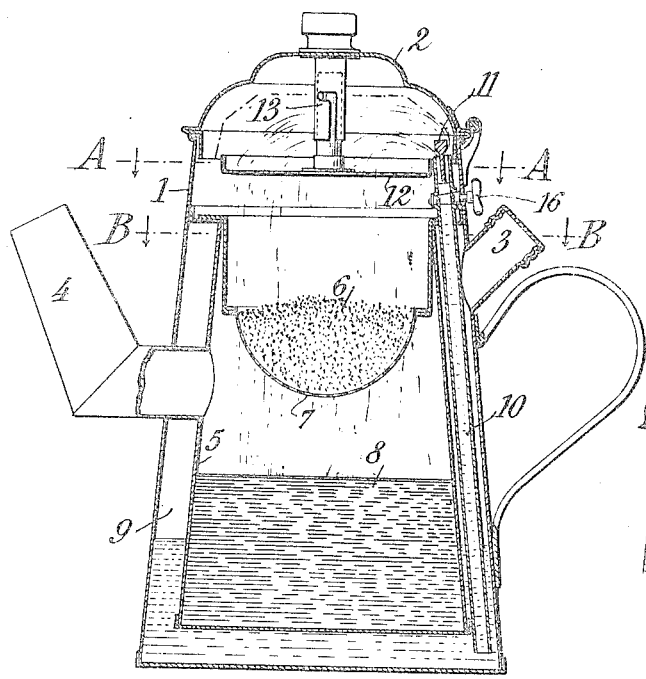
Figure 2:
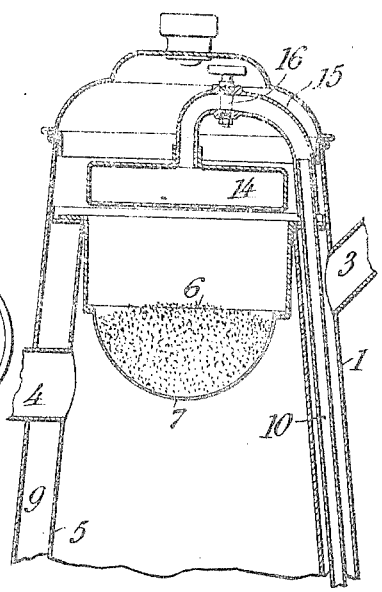
Figure 3:
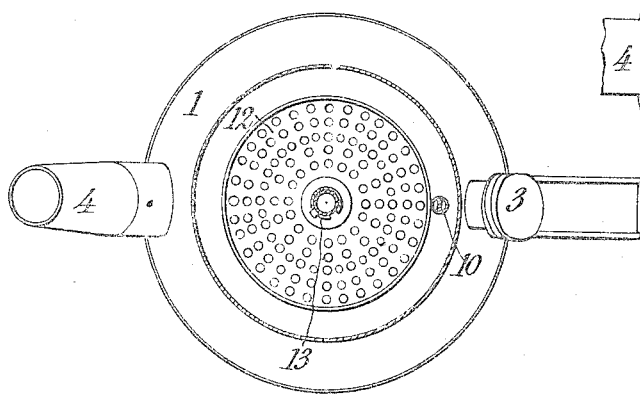
Figure 4:
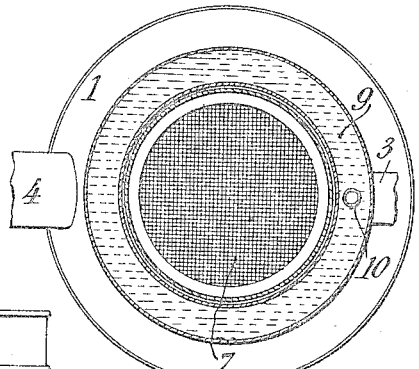

In the drawings attached to and forming a part of this specification: Figure 1 shows a vertical section through the essential parts of the invention; Fig. 2, a similar section, showing also a modified form of the distributer; Fig. 3 is a section on the line A—A of Fig. 1; Fig. 4, a section on the line B—B, of Fig. 1.

Referring to the drawings, in which similar reference characters designate similar parts:—1 is the outside vessel having the usual cover 2, filling pipe 3 and outlet spout 4; 5 is the receptacle for holding the percolated liquid; 6, the coffee or other material being treated, the receptacle being provided with the usual sieve bottom 7; 8 is the liquid that has percolated through the sieve; 9 the water-jacket surrounding the receptacle 5 holding the percolated liquid; 10 is a tube for supplying the percolating liquid located within the water-jacket 9 and extending nearly to the bottom thereof; 11 is a plug adapted to furnish a divided stream to the distributer 12, which is detachably held by the bayonet joint 13 to the cover 2 (Fig. 1); 14 is a modified form of the distributer detachably connected to the supply tube 10 by slipping its bent end 15 over the end of the siphon, and 16 is a valve for controlling the flow from the siphon to the distributer.

The operation of the device is easily understood from the drawings: The parts being set up as shown, the water is introduced through the filling pipe 3 into the water-jacket 9. When the percolator is subjected to heat the water in the water-jacket, becoming hot, rises through the supply tube 10, passing through the divided openings 11 into the coffee containing strainer 6 and collects in the bottom, as shown at 8. In order to control the supply of water, so as to keep the percolated liquid at the proper strength, there is inserted in the supply tube 10 the valve 16 (Figs. 1 and 2).

There are manifold advantages in my percolator over those known to me, among which may be mentioned the following: First, the water contained in the water-jacket is in direct contact with the source of heat, and the fact that it is a water-jacket assures the easy communication of its heat to the percolated liquid, and hinders to a very great extent the dissipation of heat from the same. Second, the automatic supply tube renders the device constant and certain in its action, and its being located inside of the water-jacket obviates the having a pipe in the middle of the percolator, which might be easily misplaced or lost. Third, the easy removal of the parts under action makes my device simple and sanitary. Other advantages are obvious from the drawings.

Having thus fully described and illustrated my invention, what I claim, is: —

1. A percolator having an outer casing and an inner chamber, the outer casing constituting a water compartment and the inner compartment constituting a liquid coffee receptacle, a tube leading from near the bottom of the water compartment to a point above the top of the coffee receptacle, said tube being located in the water compartment, a container for the ground coffee at the top of the coffee compartment, said container being open on its top side, a distributer receiving the water from said tube and located above the coffee container, said distributer having a number of holes for distributing the boiling water and a single cover closing the top of the percolator whereby when the cover is removed the coffee container is rendered accessible without the removal of additional parts.

2. A percolator having an outer casing and an inner chamber, the outer casing constituting a water compartment and the inner compartment constituting a liquid coffee receptacle, a tube leading from near the bottom of the water compartment to a point above the top of the coffee receptacle, said tube being located in the water compartment, a container for the ground coffee at the top of the coffee compartment, said container being open at its top side, a hollow distributer having a detachable connection with the top of said tube, said distributer extending over the open side of the coffee container and having a number of holes for distributing the boiling water directly into the coffee container.

3. A percolator having an outer casing and an inner chamber, the outer casing constituting a water compartment and the inner compartment constituting a liquid coffee receptacle, a tube leading from near the bottom of the water compartment to a point above the top of the coffee receptacle, said tube being located in the water compartment, a container for the ground coffee at the top of the coffee compartment, said container being open at its top side, a hollow distributer having a pipe arranged centrally at its top and curved downwardly to detachably engage the top of said tube, said distributer extending over the open top of the coffee container.

4. A percolator having an outer casing and an inner chamber, the outer casing constituting a water compartment and the inner compartment constituting a liquid coffee receptacle, a tube leading from near the bottom of the water compartment to a point above the top of the coffee receptacle, said container being open at its top side, a hollow distributer having a pipe arranged centrally at its top and curved downwardly to detachably engage the top of said tube, said distributer extending over the open top of the coffee container, and a valve for adjusting the quantity of hot water passing through said distributer.

5. A percolator having an outer casing and an inner chamber, the outer casing constituting a water compartment and having a cover at its top, the inner chamber being located below said cover, a ground coffee container at the top of said inner chamber, a tube in the water compartment leading to the top of the inner chamber, a substantially circular distributer, a tube leading centrally from the top of said distributer and thence downwardly, and detachably connected to the water tube, said tube being partially housed in said cover, and said distributer being located directly above the ground coffee container, a valve located above said tube for graduating the amount of boiling water fed to said distributer, whereby upon opening said cover the distributer valve and coffee container are rendered accessible.

6. A percolator comprising an outer water casing, an inner liquid coffee compartment, a coffee container at the top of said coffee compartment, a tube leading from said water container to a point above the coffee, a distributer above the coffee retainer and a valve for said distributer, said valve being located above the coffee container.

Signed at New York, in the county of New York and State of New York, this 28th day of November, A. D. 1914.

BURTON H. COOK.

Witnesses:
   CHAS. LYON RUSSELL,
   P. C. RICHARD.